United States Patent
Cunha et al.

(10) Patent No.: US 10,502,422 B2
(45) Date of Patent: Dec. 10, 2019

(54) COOLING A QUENCH APERTURE BODY OF A COMBUSTOR WALL

(71) Applicant: United Technologies Corporation, Farmington, CT (US)

(72) Inventors: Frank J. Cunha, Avon, CT (US); Stanislav Kostka, Jr., Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 441 days.

(21) Appl. No.: 15/035,356

(22) PCT Filed: Dec. 4, 2014

(86) PCT No.: PCT/US2014/068562
§ 371 (c)(1),
(2) Date: May 9, 2016

(87) PCT Pub. No.: WO2015/085065
PCT Pub. Date: Jun. 11, 2015

(65) Prior Publication Data
US 2016/0290643 A1    Oct. 6, 2016

Related U.S. Application Data

(60) Provisional application No. 61/912,079, filed on Dec. 5, 2013.

(51) Int. Cl.
*F23R 3/06*    (2006.01)
*F23R 3/04*    (2006.01)
(Continued)

(52) U.S. Cl.
CPC ............... *F23R 3/002* (2013.01); *F02C 7/12* (2013.01); *F02C 7/18* (2013.01); *F02C 7/24* (2013.01);
(Continued)

(58) Field of Classification Search
CPC ..................................... F23R 3/06; F23R 3/04
See application file for complete search history.

(56) References Cited

U.S. PATENT DOCUMENTS

| 4,265,085 A | 5/1981 | Fox et al. |
| 5,461,866 A | 10/1995 | Sullivan et al. |

(Continued)

FOREIGN PATENT DOCUMENTS

| GB | 2353589 | 2/2001 |
| WO | 2015085065 | 6/2015 |

OTHER PUBLICATIONS

Extended EP Search Report dated Nov. 22, 2016.

*Primary Examiner* — Todd E Manahan
*Assistant Examiner* — Alyson Joan Harrington
(74) *Attorney, Agent, or Firm* — O'Shea Getz P.C.

(57) ABSTRACT

An assembly is provided for a turbine engine. A combustor wall of the turbine engine assembly includes a shell, a heat shield and an annular body engaged with the shell and the heat shield. The annular body extends through the combustor wall. The annular body at least partially defines a quench aperture along a centerline through the combustor wall. The annular body also at least partially defines a cooling aperture in fluid communication with the quench aperture. At least a portion of the cooling aperture extends radially outward from the quench aperture relative to the centerline.

15 Claims, 11 Drawing Sheets

(51) Int. Cl.
*F23R 3/00* (2006.01)
*F02C 7/12* (2006.01)
*F02K 1/82* (2006.01)
*F02C 7/18* (2006.01)
*F02C 7/24* (2006.01)

(52) U.S. Cl.
CPC ............... F02K 1/822 (2013.01); F23R 3/04 (2013.01); F23R 3/06 (2013.01); *F05D 2220/30* (2013.01); *F05D 2240/35* (2013.01); *F05D 2260/201* (2013.01); *F05D 2260/202* (2013.01); *F05D 2260/231* (2013.01); *F23R 2900/03044* (2013.01); *Y02T 50/675* (2013.01)

(56) References Cited

U.S. PATENT DOCUMENTS

| | | | |
|---|---|---|---|
| 5,687,572 A * | 11/1997 | Schrantz | F23R 3/007 |
| | | | 431/352 |
| 5,758,503 A | 6/1998 | DuBell et al. | |
| 7,000,396 B1 * | 2/2006 | Storey | F23R 3/06 |
| | | | 60/39.23 |
| 7,059,133 B2 * | 6/2006 | Gerendas | F23R 3/002 |
| | | | 60/752 |
| 7,093,441 B2 | 8/2006 | Burd et al. | |
| 7,146,815 B2 | 12/2006 | Burd | |
| 8,443,610 B2 | 5/2013 | Hoke et al. | |
| 9,151,500 B2 * | 10/2015 | Chen | F23R 3/04 |
| 2002/0116929 A1 * | 8/2002 | Snyder | F23R 3/002 |
| | | | 60/740 |
| 2003/0182942 A1 | 10/2003 | Gerendas | |
| 2004/0104538 A1 | 6/2004 | Pidcock et al. | |
| 2007/0125093 A1 | 6/2007 | Burd et al. | |
| 2010/0186416 A1 | 7/2010 | Chen et al. | |
| 2010/0212324 A1 * | 8/2010 | Bronson | F02C 7/264 |
| | | | 60/752 |
| 2010/0251723 A1 | 10/2010 | Chen et al. | |
| 2010/0287941 A1 | 11/2010 | Kim et al. | |
| 2011/0048024 A1 | 3/2011 | Snyder et al. | |
| 2011/0120132 A1 | 5/2011 | Rudrapatna et al. | |
| 2011/0185735 A1 | 8/2011 | Snyder | |
| 2012/0297778 A1 * | 11/2012 | Rudrapatna | F23R 3/045 |
| | | | 60/755 |
| 2013/0014512 A1 | 1/2013 | Jarmon et al. | |
| 2013/0239575 A1 | 9/2013 | Chen et al. | |
| 2013/0255269 A1 | 10/2013 | McKenzie et al. | |
| 2014/0083112 A1 * | 3/2014 | Jause | F23R 3/002 |
| | | | 60/782 |
| 2014/0137568 A1 | 5/2014 | Bunel et al. | |
| 2015/0354819 A1 * | 12/2015 | Snyder | F23R 3/005 |
| | | | 60/782 |

* cited by examiner

FIG. 6

COOLING A QUENCH APERTURE BODY OF A COMBUSTOR WALL

CROSS-REFERENCE TO RELATED APPLICATION

This application claims priority to PCT Patent Application No. PCT/US14/068562 filed Dec. 4, 2014, which claims priority to U.S. Provisional Patent Appln. No. 61/912,079 filed Dec. 5, 2013, which are hereby incorporated herein by reference in their entireties.

BACKGROUND OF THE INVENTION

1. Technical Field

This disclosure relates generally to a turbine engine and, more particularly, to a combustor of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield, which defines a respective radial side of a combustion chamber. Cooling cavities extend radially between the heat shield and the shell. These cooling cavities fluidly couple impingement apertures defined in the shell with effusion apertures defined in the heat shield.

Each combustor wall may also include a plurality of quench aperture grommets located between the shell and the heat shield. Each of the quench aperture grommets defines a respective quench aperture radially through the combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. A combustor wall of the turbine engine assembly includes a shell, a heat shield and an annular body engaged with the shell and the heat shield. The annular body extends through the combustor wall. The annular body at least partially defines a quench aperture along a centerline through the combustor wall. The annular body also at least partially defines a cooling aperture in fluid communication with the quench aperture. At least a portion of the cooling aperture extends radially outward from the quench aperture relative to the centerline.

According to another aspect of the invention, a combustor wall is provided with a quench aperture fluidly coupling a plenum of a turbine engine and a combustion chamber of the turbine engine. The combustor wall includes a shell, a heat shield attached to the shell, and an annular body mounted to the shell and the heat shield. The annular body defines the quench aperture and a cooling aperture configured to direct air from the plenum into the quench aperture.

According to another aspect of the invention, a grommet is provided for a combustor wall. The grommet includes an annular body having an inner surface which at least partially defines a quench aperture through the combustor wall along a centerline. The annular body also defines a plurality of cooling apertures that are distributed at least partially around the centerline.

The body may extend vertically to an exterior surface and laterally to an inner surface that at least partially defines the quench aperture. The cooling aperture may extend through the body between the exterior surface and the inner surface.

The body may include an annular first segment attached to an annular second segment. The first segment may define a vertically extending portion of the cooling aperture. The second segment may define a laterally extending portion of the cooling aperture. The body may also define the cooling aperture with an intermediate portion. This intermediate portion may extend vertically and/or circumferentially between the inlet portion and the outlet portion.

The annular body may extend vertically between interior and exterior surfaces and laterally between the inner surface and an outer surface. The body may define a first of the cooling apertures with an inlet portion and an outlet portion. The inlet portion may extend vertically from the exterior surface. The outlet portion may extend laterally to the inner surface.

The body may include an annular first segment attached to an annular second segment. The first segment may at least partially define the inlet portion and the exterior surface. The second segment may at least partially define the outlet portion, the inner surface and the interior surface. The body may also define the cooling aperture with an intermediate portion. This intermediate portion may extend vertically and/or circumferentially between the inlet portion and the outlet portion.

The body may also define the cooling aperture with an intermediate portion. This intermediate portion may extend vertically and/or circumferentially between the inlet portion and the outlet portion.

The cooling aperture may be one of a plurality of cooling apertures that are defined by and that extend through the body.

The annular body may extend vertically to an exterior surface and laterally to an inner surface that at least partially defines the quench aperture. The cooling aperture may extend through the body between the exterior surface and the inner surface.

A portion of the cooling aperture at the inner surface may extend substantially radially relative to a centerline of the quench aperture.

A portion of the cooling aperture at the inner surface may extend substantially tangentially relative to the inner surface.

A portion of the cooling aperture at the inner surface may extend acutely relative to the inner surface.

The exterior surface may be funnel-shaped. The exterior surface may define a portion of the quench aperture. At least a portion of the exterior surface may have a curved sectional geometry.

The body may define a peripheral outer channel in which the shell is seated vertically against the body.

The body may include a shelf surface. The inner surface and the shelf surface may define a peripheral inner channel in the body.

The body may extend vertically through a cooling cavity, which may be defined vertically between the shell and the heat shield. The cooling cavity may fluidly couple one or more cooling apertures defined in the shell with one or more cooling apertures defined in the heat shield.

The heat shield may include a plurality of panels that are attached to the shell. The body may be connected to one of the panels.

The foregoing features and the operation of the invention will become more apparent in light of the following description and the accompanying drawings.

BRIEF DESCRIPTION OF THE DRAWINGS

FIG. 6 is a detailed side sectional illustration of a portion of the combustor wall of FIG. 4;

DETAILED DESCRIPTION OF THE INVENTION

Figure 1:
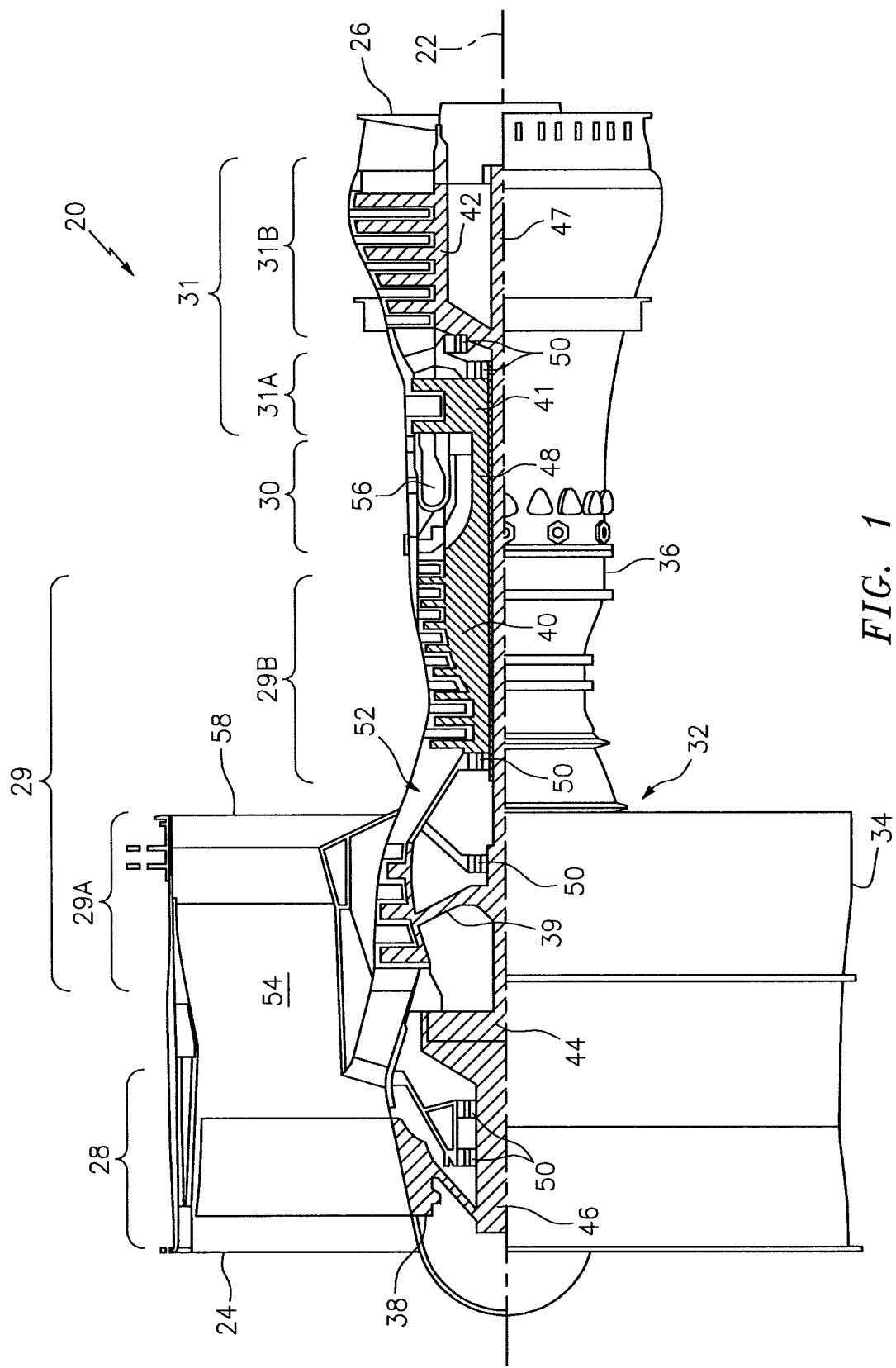
FIG. 1 is a side cutaway illustration of a geared turbine engine.

FIG. 1 is a side cutaway illustration of a geared turbine engine 20. The turbine engine 20 extends along an axial centerline 22 between a forward and upstream airflow inlet 24 and an aft and downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32, which includes a first engine case 34 and a second engine case 36.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the second engine case 36 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
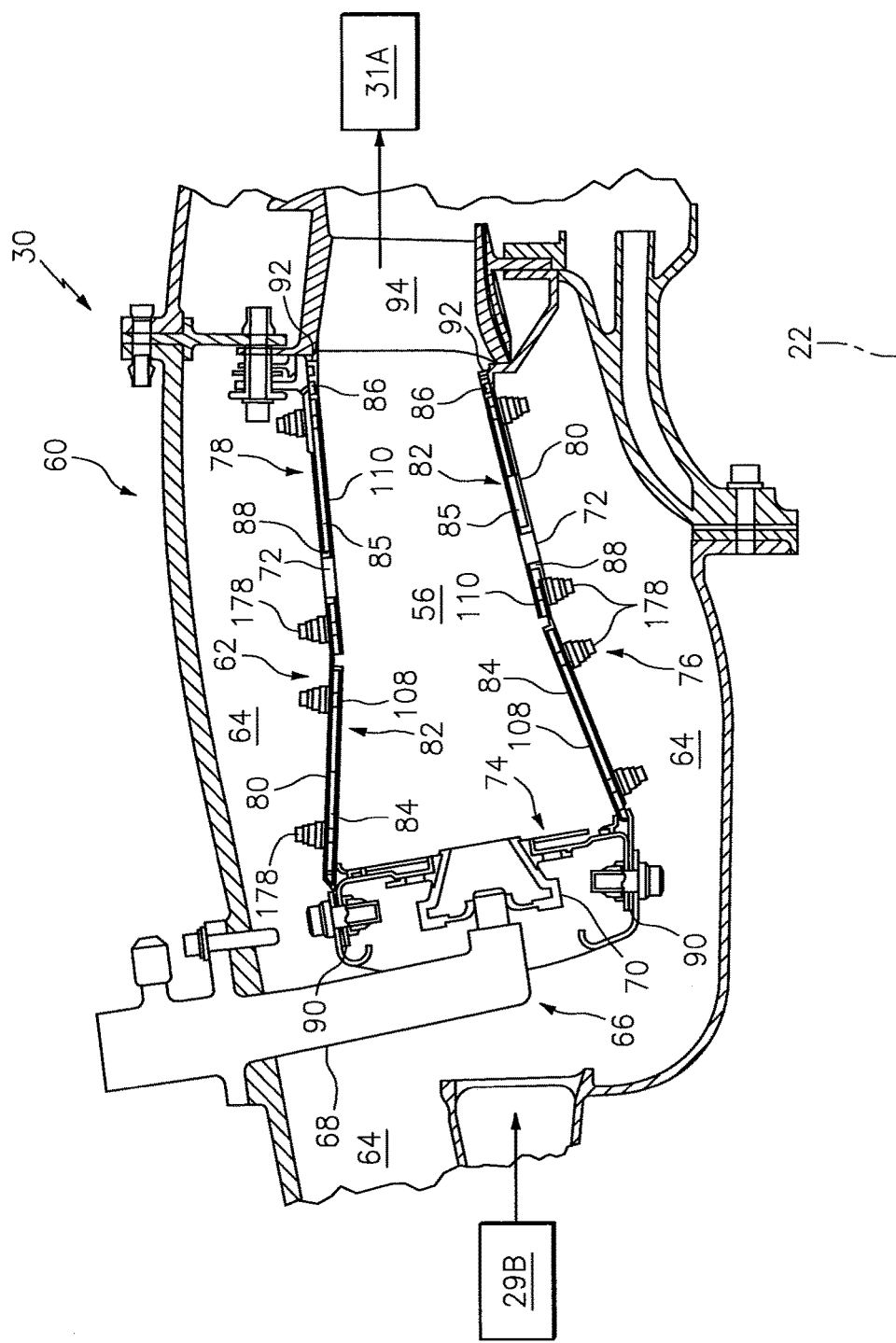
FIG. 2 is a side cutaway illustration of a portion of a combustor section.

FIG. 2 illustrates an assembly 60 of the turbine engine 20. The turbine engine assembly 60 includes a combustor 62 disposed within an annular plenum 64 of the combustor section 30. This plenum 64 receives compressed core air from the HPC section 29B, and provides the received core air to the combustor 62 as described below in further detail.

Figure 3:
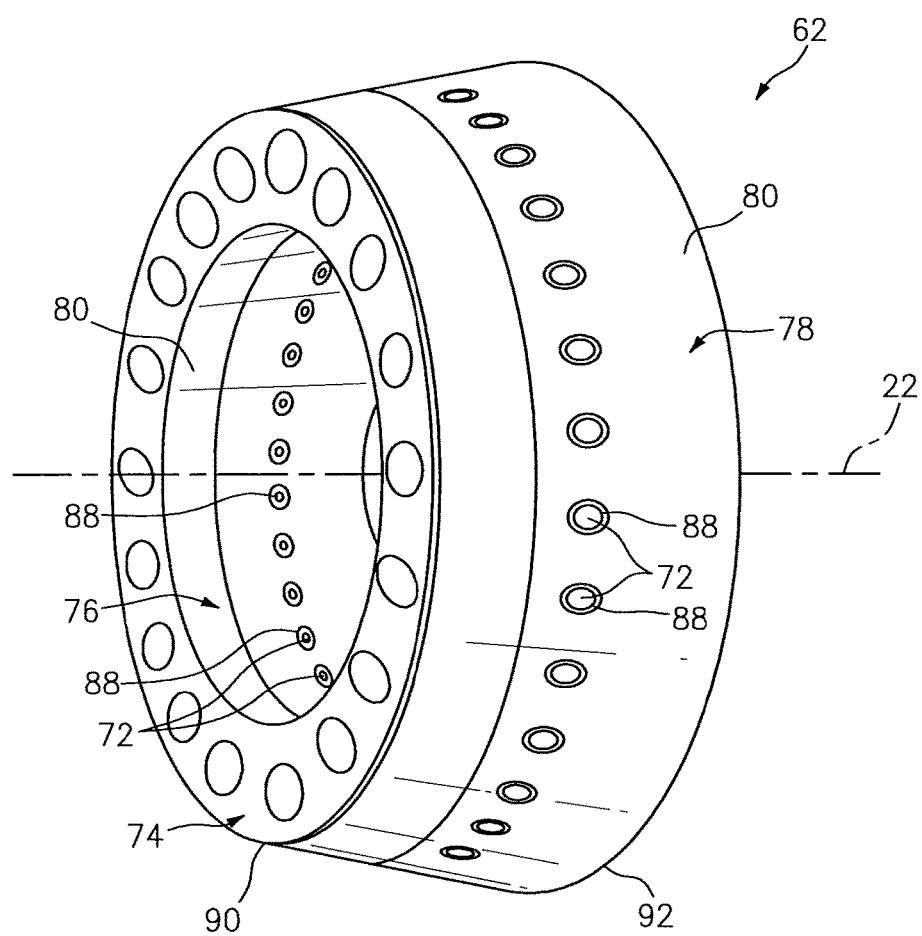
FIG. 3 is a perspective illustration of a portion of a combustor.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. One or more igniters (not shown) ignite the fuel-core air mixture. Quench apertures 72 (see also FIG. 3) in walls of the combustor 62 direct additional core air into the combustion chamber 56 to quench (e.g., stoichiometrically lean) the ignited fuel-core air mixture.

The combustor 62 may be configured as an annular floating wall combustor. The combustor 62 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the HPT section 31A, thereby defining the combustion chamber 56.

Figure 4:
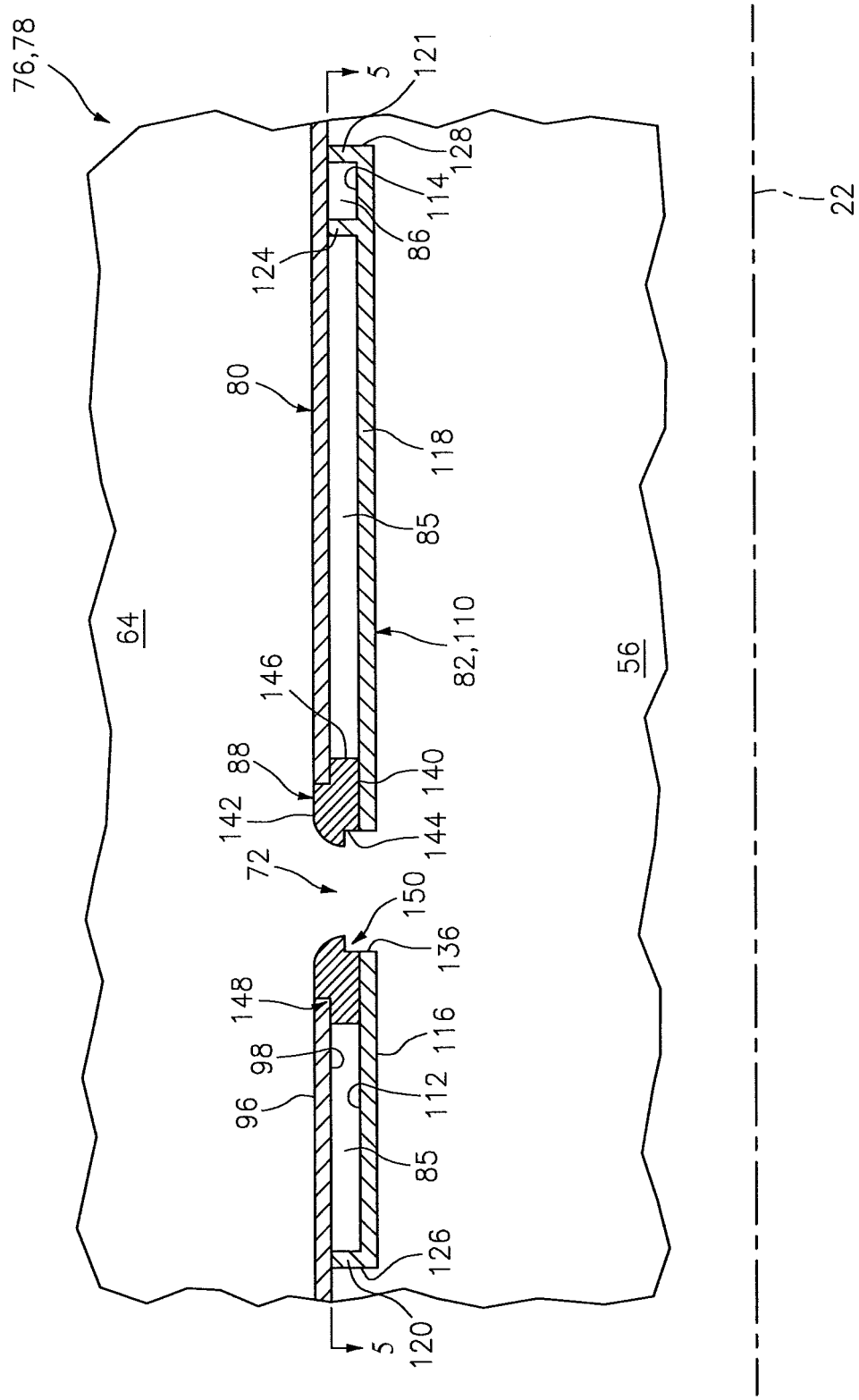
FIG. 4 is a side sectional illustration of a portion of a combustor wall.
Figure 5:
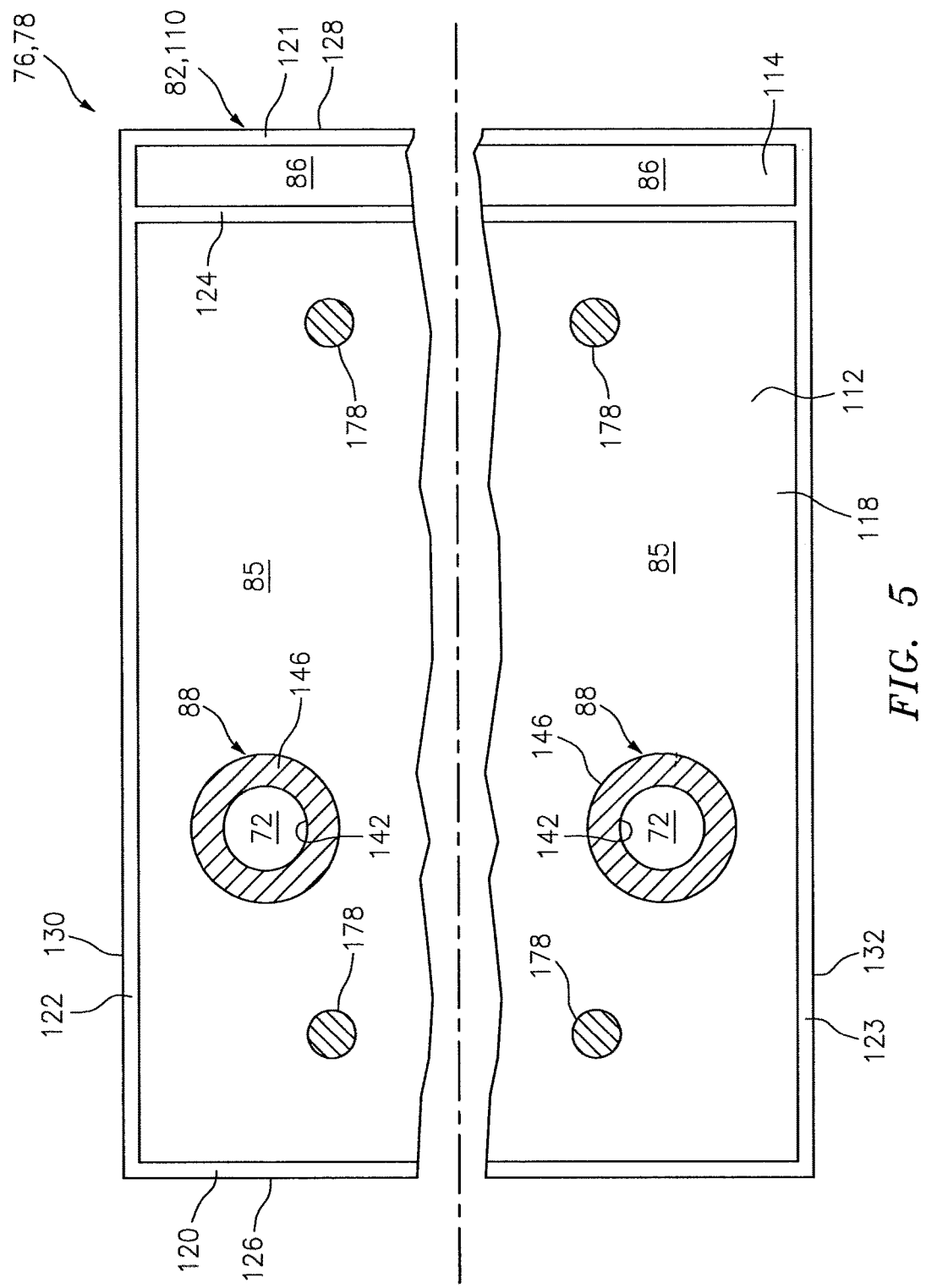
FIG. 5 is a circumferential sectional illustration of a portion of the combustor wall of FIG. 4.
Figure 6:
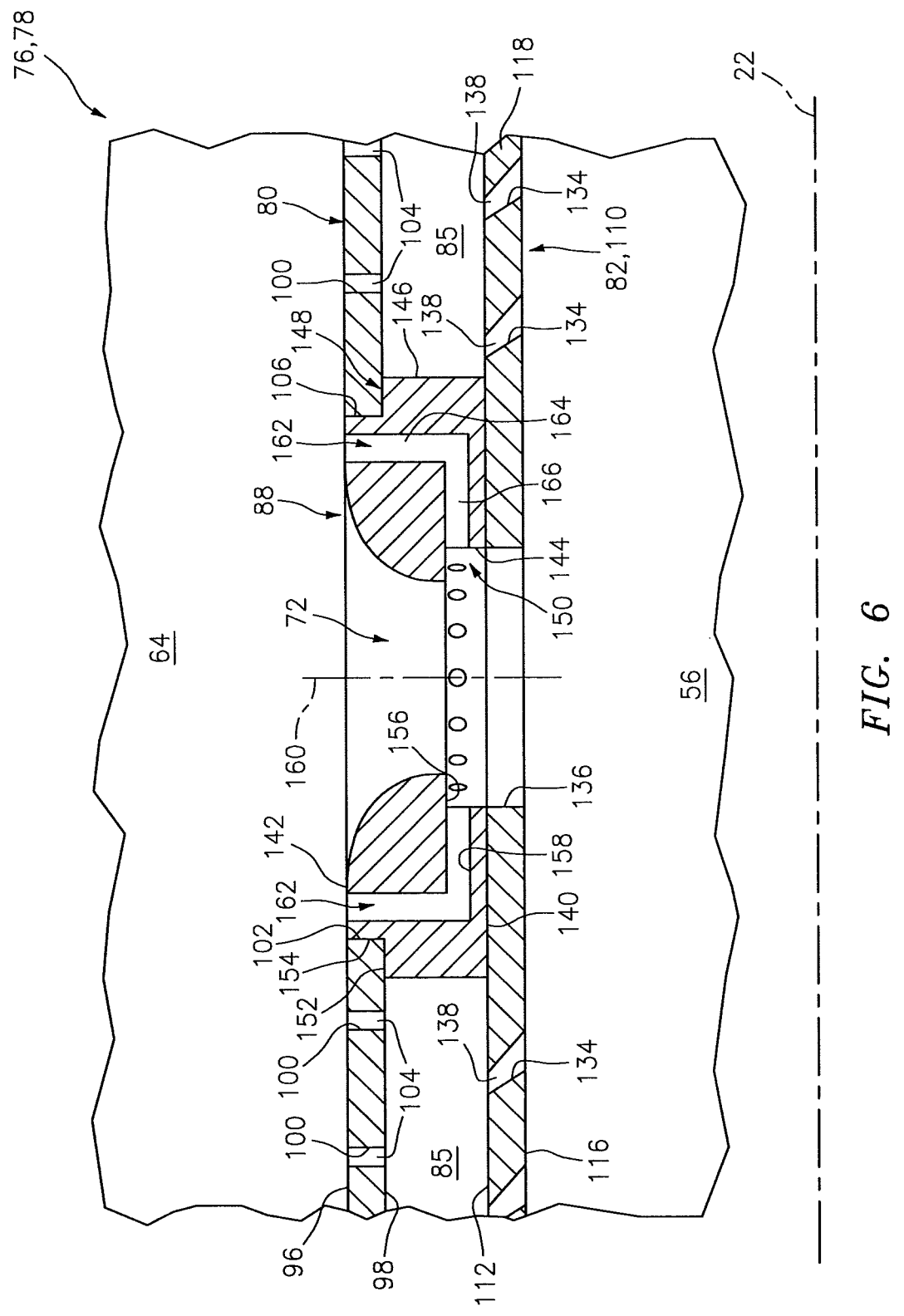
Figure 7:
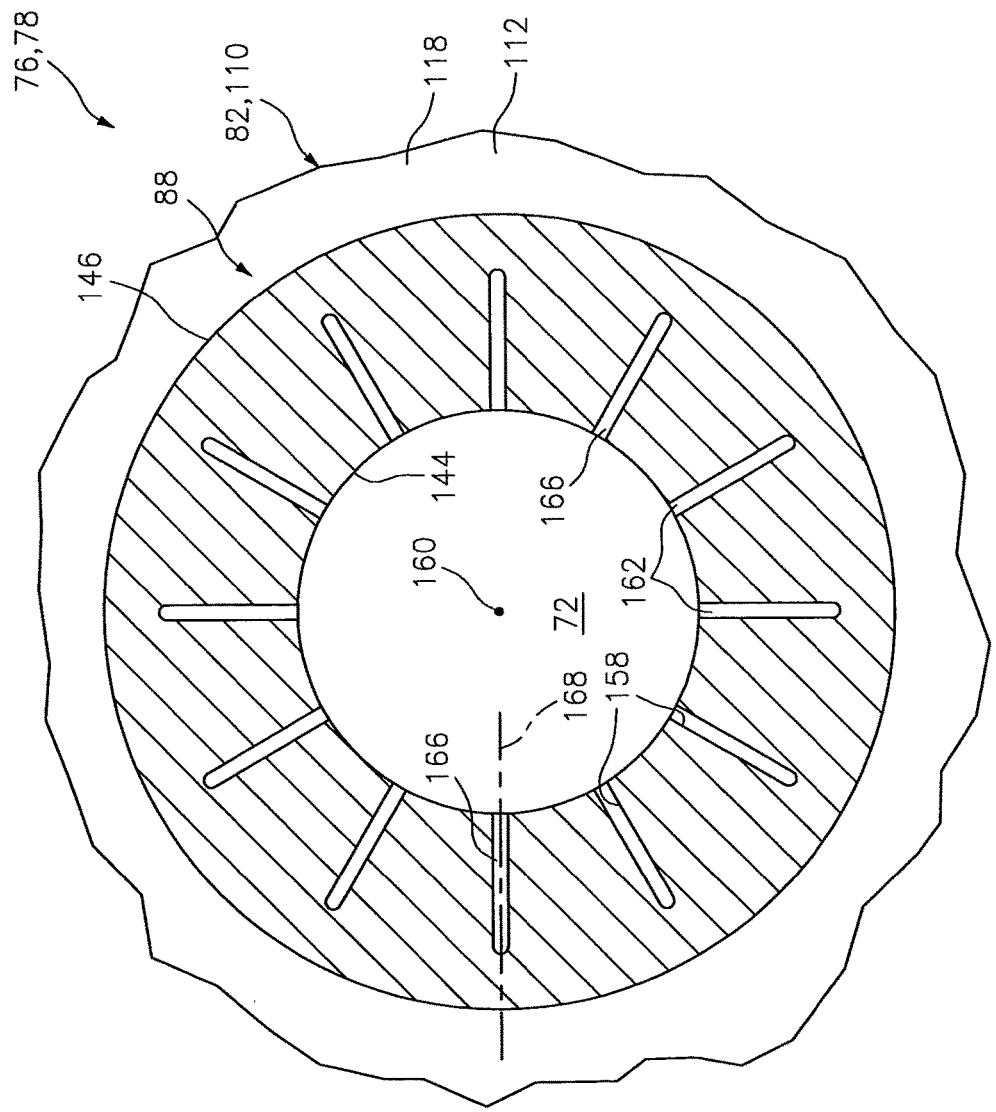
FIG. 7 is a detailed top sectional illustration of a portion of the combustor wall of FIG. 6.

FIG. 4 is a side sectional illustration of an exemplary downstream portion of one of the combustor walls 76, 78. FIG. 5 is a circumferential sectional illustration of a portion of the combustor wall 76, 78 of FIG. 4. FIG. 6 is a detailed side sectional illustration of a portion of the combustor wall 76, 78 of FIG. 4. FIG. 7 is a detailed top sectional illustration of a portion of the combustor wall 76, 78 of FIG. 6. It should be noted that some details of the combustor wall 76, 78 shown in FIGS. 6 and 7 are not shown in FIGS. 2, 4 and 5 for ease of illustration.

Referring to FIGS. 2 and 4-7, each combustor wall 76, 78 may each be configured as a multi-walled structure; e.g., a hollow dual-walled structure. Each combustor wall 76, 78 of FIGS. 2 and 4-7, for example, includes a tubular combustor shell 80 and a tubular combustor heat shield 82 with one or more cooling cavities 84-86 (e.g., impingement cavities) between the shell 80 and the heat shield 82. Each combustor wall 76, 78 may also include one or more annular quench aperture bodies 88 (e.g., grommets). These quench aperture bodies 88 are disposed circumferentially around the centerline 22. Each quench aperture body 88 partially or completely defines a respective one of the quench apertures 72 (see also FIG. 3) as described below in further detail.

Referring to FIG. 2, the shell 80 extends circumferentially around the centerline 22. The shell 80 extends axially along the centerline 22 between an axial forward end 90 and an axial aft end 92. The shell 80 is connected to the bulkhead 74 at the forward end 90. The shell 80 may be connected to a stator vane assembly 94 or the HPT section 31A at the aft end 92.

Referring to FIGS. 4 and 6, the shell 80 has an exterior surface 96, an interior surface 98, one or more aperture surfaces 100, and one or more aperture surfaces 102. At least a portion of the shell 80 extends (e.g., radially) between the shell exterior surface 96 and the shell interior surface 98. The shell exterior surface 96, which may also be referred to as a plenum surface, defines a portion of a boundary of the plenum 64. The shell interior surface 98, which may also be referred to as a cavity surface, defines a portion of a boundary of one or more of the cavities 84-86 (see FIG. 2).

Referring to FIG. 6, the aperture surfaces 100 may be arranged in one or more arrays disposed along the centerline 22. The aperture surfaces 100 in each array may be arranged circumferentially around the centerline 22. Each of the aperture surfaces 100 defines a cooling aperture 104. This cooling aperture 104 extends vertically (e.g., radially) through the shell 80 from the shell exterior surface 96 to the shell interior surface 98. The cooling aperture 104 may be configured as an impingement aperture. Each aperture surface 100 of FIG. 6, for example, is configured to direct a jet of cooling air to impinge (e.g., substantially perpendicularly) against the heat shield 82.

The aperture surfaces 102 may be arranged circumferentially around the centerline 22. Each aperture surface 102 defines an aperture 106 for receiving a respective one of the quench aperture bodies 88. Each aperture 106 extends vertically through the shell 80 from the shell exterior surface 96 to the shell interior surface 98.

Referring to FIG. 2, the heat shield 82 extends circumferentially around the centerline 22. The heat shield 82 extends axially along the centerline 22 between an axial forward end and an axial aft end. The forward end is located at (e.g., in, on, adjacent or proximate) an interface between the combustor wall 76, 78 and the bulkhead 74. The aft end may be located at an interface between the combustor wall 76, 78 and the stator vane assembly 94 or the HPT section 31A.

The heat shield 82 may include one or more heat shield panels 108 and 110, one or more of which may have an arcuate geometry. The panels 108 and 110 are respectively arranged at discrete locations along the centerline 22. The panels 108 are disposed circumferentially around the centerline 22 and faun a forward hoop. The panels 110 are disposed circumferentially around the centerline 22 and form an aft hoop. Alternatively, the heat shield 82 may be configured from one or more tubular bodies.

Referring to FIGS. 4 and 5, each of the panels 110 has one or more interior surfaces 112 and 114 and an exterior surface 116. At least a portion of the panel 110 extends vertically between the interior surfaces 112 and 114 and the exterior surface 116. Each interior surface 112, which may also be referred to as a cavity surface, defines a portion of a boundary of a respective one of the cooling cavities 85. Each interior surface 114, which may also be referred to as a cavity surface, defines a portion of a boundary of a respective one of the cooling cavities 86. The exterior surface 116, which may also be referred to as a chamber surface, defines a portion of the combustion chamber 56.

Each panel 110 includes a panel base 118 and one or more panel rails 120-124. The panel base 118 and the panel rails 120 and 122-124 may collectively define the interior surface 112. The panel base 118 and the panel rails 121-124 may collectively define the interior surface 114. The panel base 118 may define the exterior surface 116.

The panel base 118 may be configured as a generally curved (e.g., arcuate) plate. The panel base 118 extends axially between an axial forward end 126 and an axial aft end 128. The panel base 118 extends circumferentially between opposing circumferential ends 130 and 132.

The panel rails may include one or more axial end rails 120 and 121 and one more circumferential end rails 122 and 123. The panel rails may also include at least one axial intermediate rail 124. Each of the panel rails 120-124 of the inner wall 76 extends radially in from the respective panel base 118; see FIG. 2. Each of the panel rails 120-124 of the outer wall 78 extends radially out from the respective panel base 118; see FIG. 2.

The axial end and intermediate rails 120, 121 and 124 extend circumferentially between and are connected to the circumferential end rails 122 and 123. The axial end rail 120 is arranged at (e.g., on, adjacent or proximate) the forward end 126. The axial end rail 121 is arranged at the aft end 128. The axial intermediate rail 124 is disposed axially between the axial end rails 120 and 121, for example, proximate the aft end 128. The circumferential end rail 122 is arranged at the circumferential end 130. The circumferential end rail 123 is arranged at the circumferential end 132.

Referring to FIG. 6, each panel 110 may also have one or more aperture surfaces 134 and one or more aperture surfaces 136. The aperture surfaces 134 may be respectively arranged in one or more arrays disposed along the centerline 22. The aperture surfaces 134 in each array may be disposed circumferentially around the centerline 22. Each of the aperture surfaces 134 defines a cooling aperture 138 in the panel 110 and, thus, the heat shield 82. This cooling aperture 138 may extend vertically and/or laterally (e.g., circumferentially and/or axially) through the panel base 118. The cooling aperture 138 may be configured as an effusion aperture. Each aperture surface 134 of FIG. 6, for example, is configured to direct a jet of cooling air into the combustion chamber 56 to film cool a downstream portion of the heat shield 82.

The aperture surfaces 136 may be arranged circumferentially around the centerline 22. Each aperture surface 136 may define a portion of a respective one of the quench apertures 72. More particularly, each aperture surface 136 defines an aperture that extends vertically through the respective panel 110 and, thus, the heat shield 82 from the interior surface 112 to the exterior surface 116.

Referring to FIGS. 5-7, each of the quench aperture bodies 88 is attached to (or formed integral with) a respective one of the panel bases 118. Each quench aperture body 88, for example, may be brazed, welded, adhered or otherwise bonded to the respective panel bases 118.

One or more of the quench aperture bodies 88 are located laterally within and extend vertically through a respective one of the cooling cavities 85. One or more of the quench aperture bodies 88, for example, may be arranged circumferentially between the circumferential end rails 122 and 123 of a respective one of the panels 110. One or more of the quench aperture bodies 88 may be arranged axially between the axial end and intermediate rails 120 and 124 of a respective one of the panels 110.

Each quench aperture body 88 has an interior surface 140, an exterior surface 142, an inner surface 144 and an outer surface 146. The quench aperture body 88 extends vertically from the interior surface 140, which is engaged with the interior surface 112, to the exterior surface 142. The quench aperture body 88 extends laterally between the inner surface 144 and the outer surface 146.

The exterior surface 142 may be funnel-shaped with a curved sectional geometry. With this configuration, the inner surface 144 as well as the exterior surface 142 define a portion of a respective one of the quench apertures 72. More particularly, the exterior surface 142 and the inner surface 144 define an aperture that extends vertically through the respective quench aperture body 88 to the interior surface 140.

Figure 10:
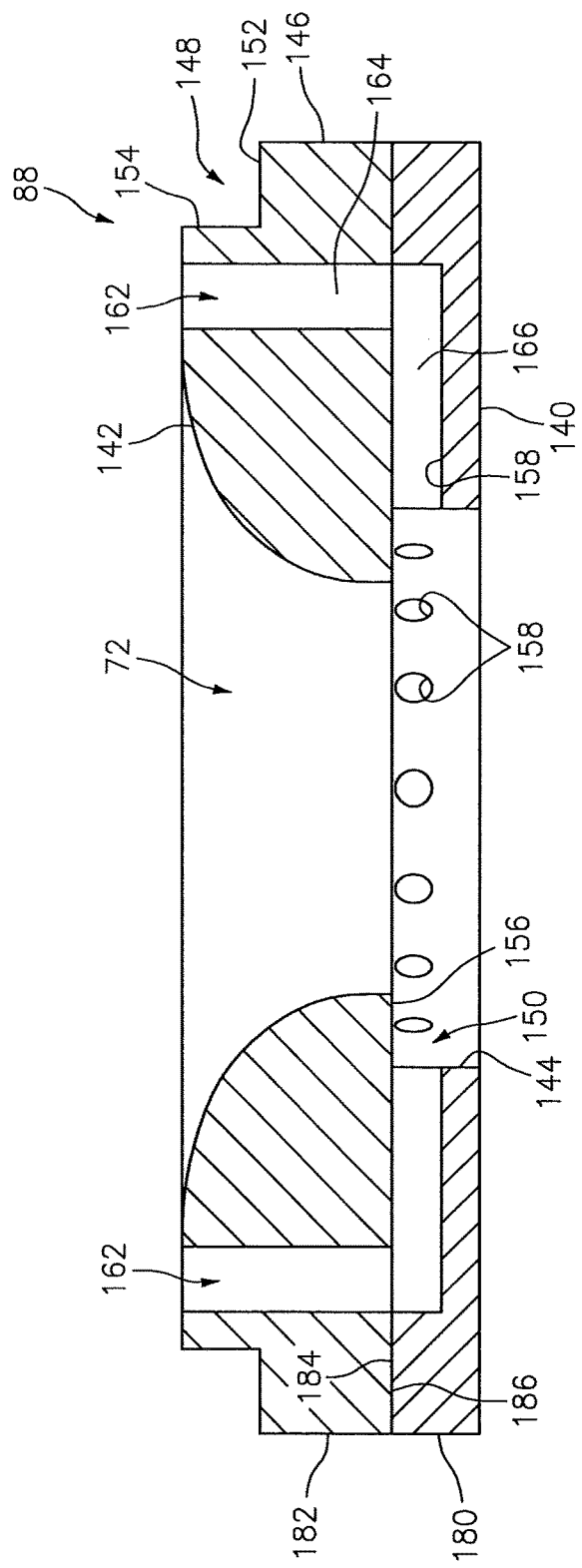
FIG. 10 is a side sectional illustration of a quench aperture grommet.

Each quench aperture body 88 may define an annular peripheral outer channel 148 and/or an annular peripheral inner channel 150 (see also FIG. 10). The outer channel 148 extends vertically into the quench aperture body 88 from the exterior surface 142 to a first outer channel surface 152 (e.g., a shelf surface). The outer channel 148 extends laterally into the quench aperture body 88 from the outer surface 146 (e.g., radially relative to axis 160) to a second outer channel surface 154, which may be substantially perpendicular to the first outer channel surface 152. A width (e.g., a diameter) of the second outer channel surface 154 may be substantially equal to (or less than) a lateral width (e.g., a diameter) of a respective one of the aperture surfaces 102.

The inner channel 150 extends vertically into the quench aperture body 88 from the interior surface 140 to a first inner channel surface 156. The inner channel 150 extends laterally into the quench aperture body 88 from the inner surface 144 to a second inner channel surface (e.g., the inner surface 144), which may be substantially perpendicular to the first inner channel surface 156. A lateral width (e.g., a diameter) of the inner surface 144 may be substantially equal to (or less than) a lateral width (e.g., a diameter) of a respective one of the aperture surfaces 136.

Each quench aperture body 88 may also have one or more aperture surfaces 158. These aperture surfaces 158 may be distributed at least partially around a centerline 160 of a respective one of the quench apertures 72 (see FIG. 7); e.g., in a circumferential array. Each of the aperture surfaces 158 defines a cooling aperture 162 in the respective quench aperture body 88. This cooling aperture 162 extends through the quench aperture body 88 from an inlet in the exterior surface 142 to an outlet in the inner surface 144.

The quench aperture body 88 may define each cooling aperture 162 with an inlet portion 164 at (e.g., in, adjacent or proximate) the exterior surface 142 and an outlet portion 166 at the inner surface 144. The inlet portion 164 may extend substantially vertically (e.g., without a lateral component) from the inlet in the exterior surface 142 to (or towards) the outlet portion 166. The outlet portion 166 may extend substantially laterally (e.g., without a vertical component) from the outlet in the inner surface 144 to (or towards) the inlet portion 164. Of course, in other embodiments, the inlet portion 164 may also extend laterally and/or the outlet portion 166 may also extend vertically.

Figure 8:
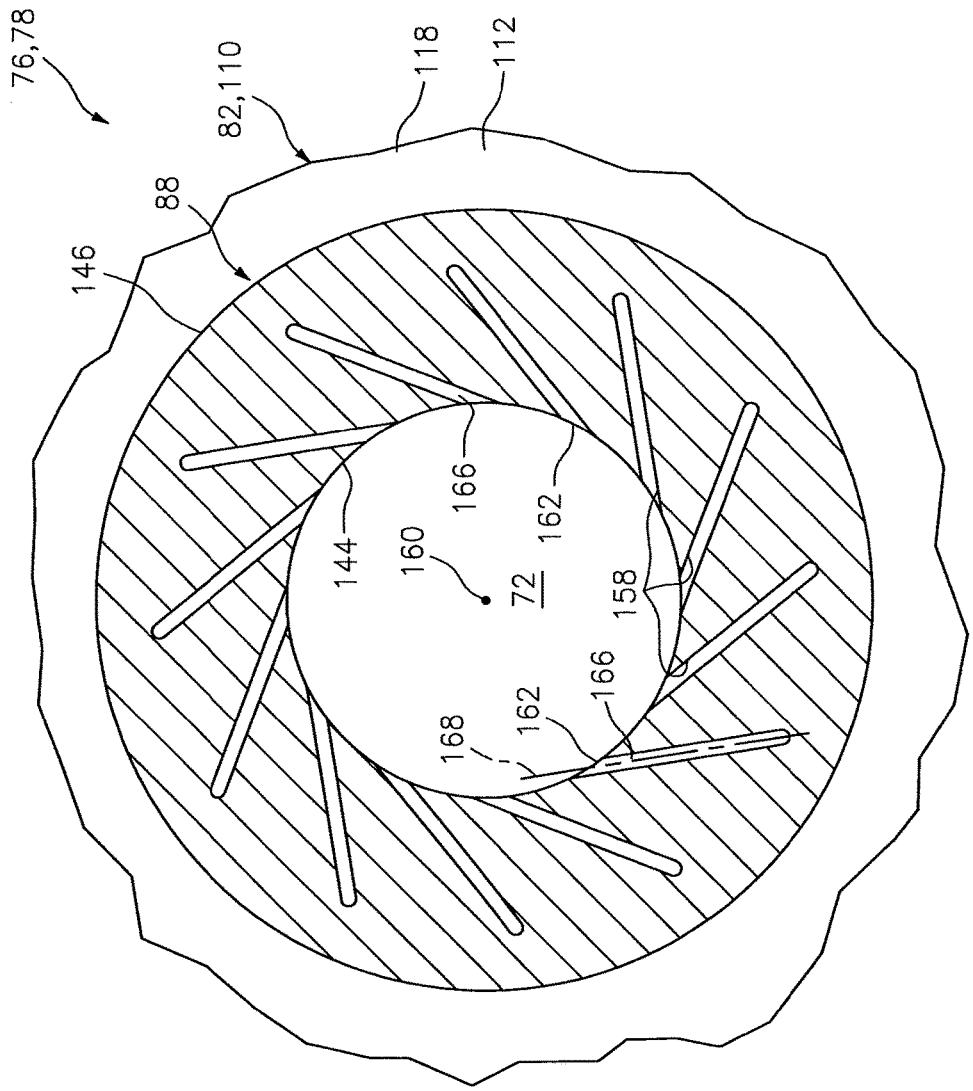
FIGS. 8 and 9 are detailed top sectional illustrations of respective portions of alternate embodiment combustor walls.

Referring to FIGS. 7 and 8, the outlet portion 166 of one or more of the cooling apertures 162 may extend along a substantially straight centerline 168 through the quench aperture body 88. Each outlet portion 166 of FIG. 7, for example, extends substantially radially relative to the centerline 160; e.g., the centerline 168 may be a ray of the centerline 160. In another example, each outlet portion 166 of FIG. 8 extends substantially tangentially relative to the inner surface 144. In other embodiments, of course, the centerline 168 of each outlet portion 166 may follow a substantially straight trajectory other than those described above and illustrated in the drawings; e.g., the centerline 168 may be acutely offset from the inner surface 144 by between about fifteen degrees (15°) and about eighty-five degrees (85°).

Figure 9:
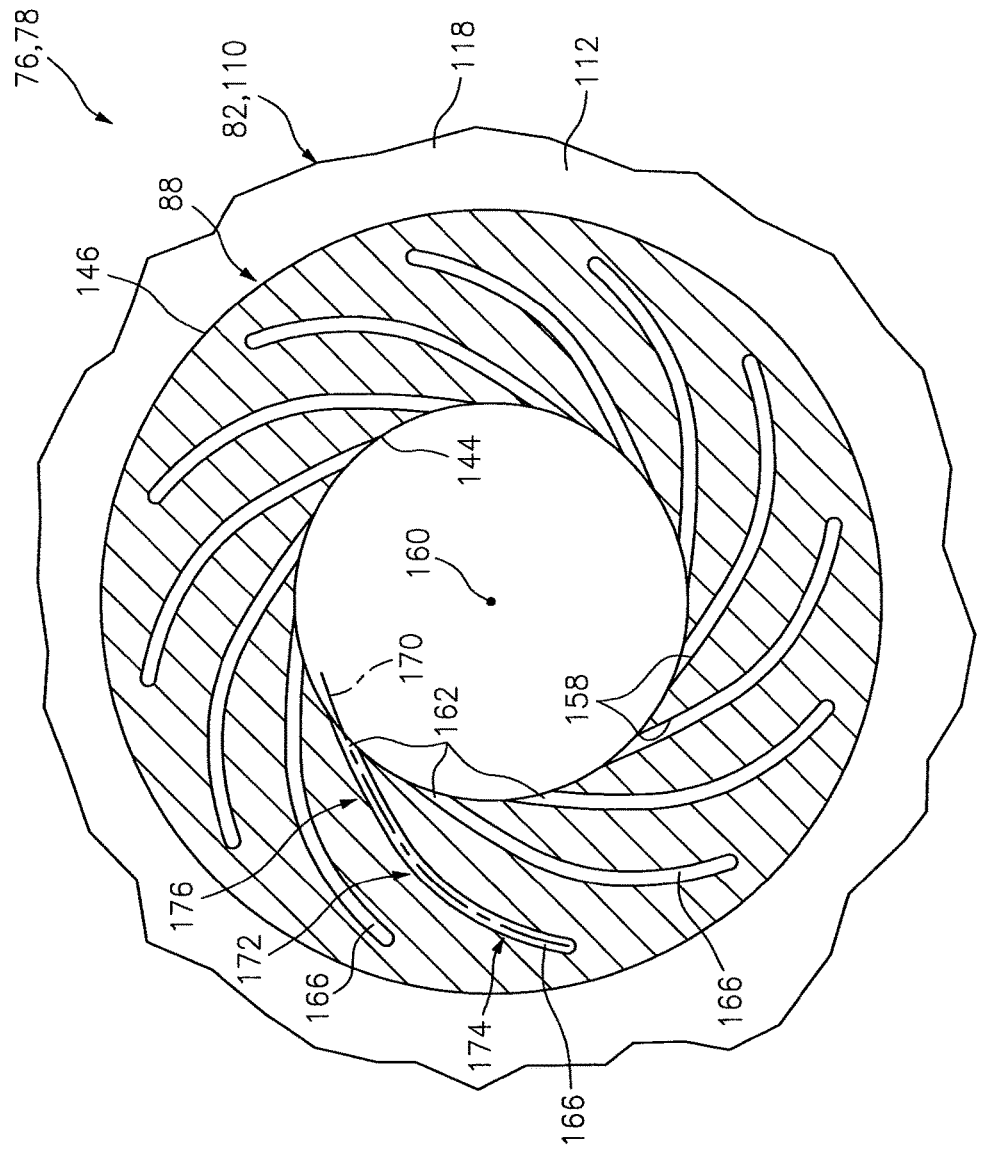

Alternatively, referring to FIG. 9, the outlet portion 166 of one or more of the cooling apertures 162 may each extend along a curved and/or compound centerline 170. Each outlet portion 166 of FIG. 9, for example, generally spirals partially (or completely) around the centerline 160. Each outlet portion 166 may include one or more sub-portions such as, for example, a curved intermediate sub-portion 172 between a pair of straight sub-portions 174 and 176. The sub-portion 174 extends from the sub-portion 172 to (or towards) the inlet portion 164 (see FIG. 6). The sub-portion 176 extends substantially tangentially to the inner surface 144. In other embodiments, of course, the sub-portion 176 may extend substantially radially relative to the centerline 160 or the centerline 170 of the sub-portion 176 may be acutely offset from the inner surface 144. In addition, in other embodiments, one or more of the sub-portions 174 and 176 may each be curved and/or the sub-portion 172 may be straight.

Referring to FIG. 2, the heat shield 82 of the inner wall 76 circumscribes the shell 80 of the inner wall 76, and defines an inner side of the combustion chamber 56. The heat shield 82 of the outer wall 78 is arranged radially within the shell 80 of the outer wall 78, and defines an outer side of the combustion chamber 56 that is opposite the inner side.

Referring now to FIG. 6, each quench aperture body 88 is (e.g., axially and circumferentially) aligned and mated with a respective one of the apertures 106. A portion of the shell 80 that includes a respective one of the aperture surfaces 102, for example, is seated within the outer channel 148 vertically against the first outer channel surface 152; e.g., the shelf surface. In this manner, the respective quench aperture body 88 may form a seal with the shell interior surface 98 and, thus, the shell 80.

Referring to FIG. 2, the heat shield 82 and, more particularly, each of the panels 108 and 110 may be respectively attached to the shell 80 by a plurality of mechanical attachments 178; e.g., threaded studs respectively mated with washers and nuts. The shell 80 and the heat shield 82 thereby respectively form the cooling cavities 84-86 in each combustor wall 76, 78.

Referring to FIGS. 4-6, each cooling cavity 85 is defined and extends vertically between the interior surface 98 and a respective one of the interior surfaces 112 as set forth above. Each cooling cavity 85 is defined and extends circumferentially between the circumferential end rails 122 and 123 of a respective one of the panels 110. Each cooling cavity 85 is defined and extends axially between the axial end and intermediate rails 120 and 124 of a respective one of the panels 110. In this manner, each cooling cavity 85 may fluidly couple one or more of the cooling apertures 104 in the shell 80 with one or more of the cooling apertures 138 in the heat shield 82.

During turbine engine operation, core air from the plenum 64 is directed into each cooling cavity 85 through respective cooling apertures 104. This core air (e.g., cooling air) may impinge against the respective panel base 118, thereby impingement cooling the panel 110 and the heat shield 82. The cooling air within each cooling cavity 85 is subsequently directed through the cooling apertures 138 into the combustion chamber 56 to film cool a downstream portion of the heat shield 82. Within each cooling aperture 138, the cooling air may also cool the heat shield 82 through convective heat transfer.

In addition, core air from the plenum 64 is also directed into each cooling aperture 162. For example, the flow of the core air (e.g., quench air) vertically through the quench aperture 72 from the plenum 64 and into the combustion chamber 56 may create a relatively low pressure zone within the inner channel 150 and, thus, a pressure drop across the cooling apertures 162. This pressure drop may force the core air through the cooling apertures 162 and into the quench apertures 162.

Within the cooling aperture 162, the core air (e.g., cooling air) may cool the respective quench aperture body 88 through convective heat transfer. The cooling apertures 162 of FIGS. 8 and 9 may also direct the cooling air into each quench aperture 72 in a manner that film cools the respective inner surface 144 and/or to induce vortices that may increase convective heat transfer within the quench aperture 72. The cooling apertures 162 of FIGS. 7-9 therefore are operable to reduce the temperature of and, thus, thermally induced stresses within the respective quench aperture body 88.

In some embodiments, referring to FIG. 6, one or more of the quench aperture bodies 88 may each be formed as a unitary body. Each quench aperture body 88, for example, may be cast or additively manufactured as a single unit and/or machined from a single billet of material. Alternatively, referring to FIG. 10, one or more of the quench aperture bodies 88 may each be configured with a plurality of discrete annular body segments 180 and 182 that are attached (e.g., bonded and/or mechanically fastened) to one another. The first segment 180, for example, may extend vertically from the interior surface 140 to a first mating surface 184. The second segment 182 may extend vertically from the exterior surface 142 to a second mating surface 186, which may also form the first inner channel surface 156. The first mating surface 184 may be brazed or otherwise bonded to the second mating surface 186 to provide the respective quench aperture body 88. Of course, in other embodiments, one or more of the quench aperture bodies 88 may each be configured with additional or alternative vertical and/or lateral body segments.

Figure 11:
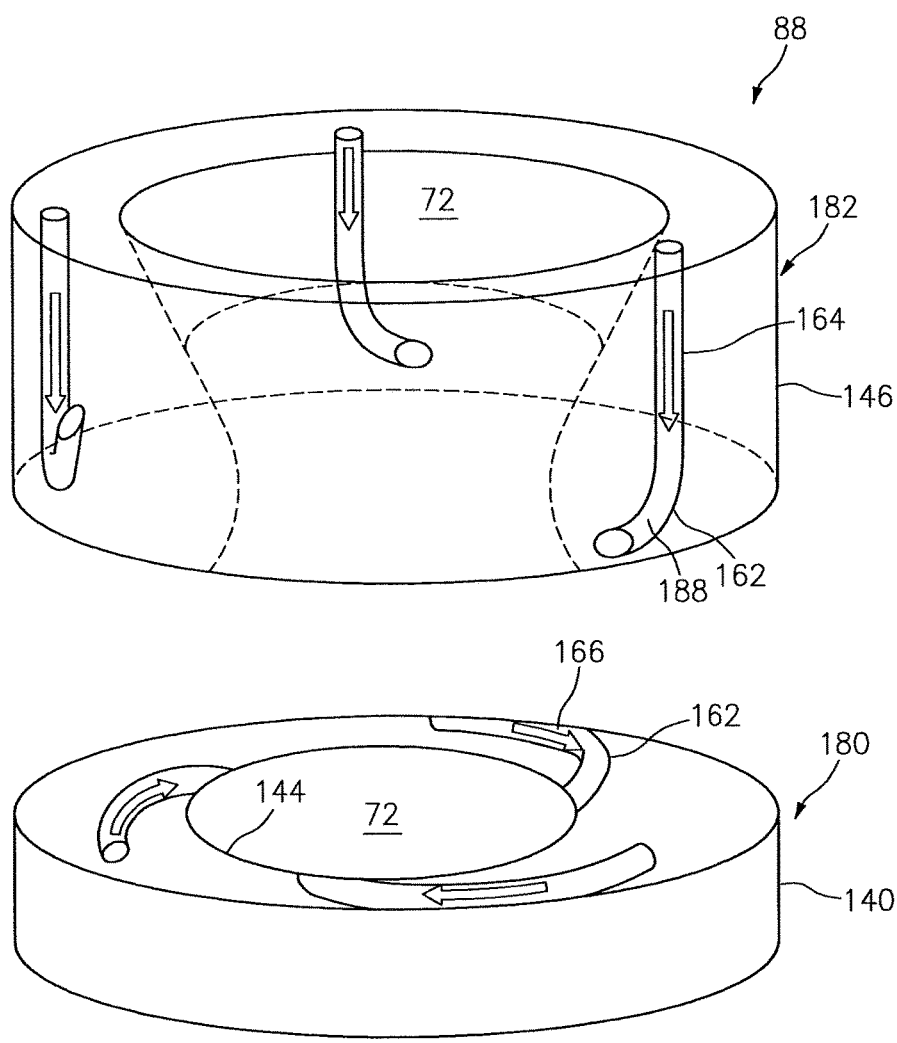
FIG. 11 is an exploded perspective illustration of an alternate embodiment quench aperture grommet.

In some embodiments, referring to FIG. 11, one or more of the quench aperture bodies 88 may each define one or more of the cooling apertures 162 with at least one additional intermediate portion 188. This intermediate portion 188 may extend vertically and laterally between the inlet portion 164 and the outlet portion 166. The intermediate portion 188, for example, may extend along a curved centerline. Alternatively, the intermediate portion 188 may extend along a substantially straight and diagonal centerline. In the embodiment of FIG. 11, the intermediate portion 188 is defined by the second segment 182. The present invention, however, is not limited to such a configuration.

In some embodiments, referring to FIGS. 6 and 7, each of the surfaces 102, 136, 142, 144, 146 and 154 may have a circular cross-section. In other embodiments, however, one or more of the surfaces 102, 136, 142, 144, 146 and 154 may each have a non-circular cross-section. Examples of a non-circular cross-section include, but are not limited to, an oval cross-section, an elliptical cross-section, a pear-shaped cross-section, a teardrop cross-section, a polygonal (e.g., rectangular) cross-section, or any other symmetric or asymmetric shaped cross-section with, for example, its major axis aligned (e.g., parallel) with the centerline 22. Alternatively, the cross-section of one or more of the foregoing surfaces may each be any geometry resulting from an overlap or connection of any of the previously mentioned shapes.

The terms "forward", "aft", "inner", "outer", "radial", "circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
   a combustor wall including a shell, a heat shield and an annular body engaged with the shell and the heat shield;
   the annular body extending vertically through the combustor wall and at least partially defining a quench aperture along a centerline through the combustor wall, and a cooling aperture in fluid communication with the quench aperture;
   wherein at least a portion of the cooling aperture extends radially outward from the quench aperture relative to the centerline;
   wherein the annular body includes an inner surface and a shelf surface vertically recessed within the combustor wall relative to an exterior surface of the heat shield, the exterior surface of the heat shield configured to form a portion of a peripheral boundary of a combustion chamber of the turbine engine;
   wherein the annular body extends vertically to an exterior surface of the annular body and laterally to the inner surface that at least partially defines the quench aperture;
   wherein the inner surface and the shelf surface define a peripheral inner channel in the annular body, the shelf surface facing toward the combustion chamber; and
   wherein the exterior surface of the annular body is flush with an exterior surface of the shell, the exterior surface of the shell facing away from the combustion chamber.

2. The assembly of claim 1, wherein the cooling aperture is one of a plurality of cooling apertures that are defined by and extend through the annular body.

3. The assembly of claim 1, wherein the cooling aperture extends through the annular body between the exterior surface of the annular body and the inner surface.

4. The assembly of claim 3, wherein a portion of the cooling aperture at the inner surface extends substantially radially relative to the centerline.

5. The assembly of claim 3, wherein a portion of the cooling aperture at the inner surface extends substantially tangentially relative to the inner surface.

6. The assembly of claim 3, wherein a portion of the cooling aperture at the inner surface extends acutely relative to the inner surface.

7. The assembly of claim 3, wherein the annular body defines the cooling aperture with an inlet portion and an outlet portion; the inlet portion extends vertically from the exterior surface of the annular body; and the outlet portion extends laterally to the inner surface.

8. The assembly of claim 7, wherein the annular body further defines the cooling aperture with an intermediate portion that extends vertically and laterally between the inlet portion and the outlet portion.

9. The assembly of claim 7, wherein the annular body includes an annular first segment attached to an annular second segment; the first segment at least partially defines the inlet portion and the exterior surface of the annular body; and the second segment at least partially defines the outlet portion and the inner surface.

10. The assembly of claim 3, wherein the exterior surface of the annular body is funnel-shaped and defines a portion of the quench aperture.

11. The assembly of claim 1, wherein the annular body defines a peripheral outer channel in which the shell is seated vertically against the annular body.

12. The assembly of claim 1, wherein the annular body extends vertically through a cooling cavity defined vertically between the shell and the heat shield; and the cooling cavity fluidly couples one or more cooling apertures defined in the shell with one or more cooling apertures defined in the heat shield.

13. The assembly of claim 1, wherein the heat shield includes a plurality of panels that are attached to the shell, and the annular body is connected to one of the panels.

14. An assembly for a turbine engine, the assembly comprising:
a combustor wall including a shell, a heat shield and an annular body engaged with the shell and the heat shield;
the annular body extending through the combustor wall and at least partially defining a quench aperture and a cooling aperture, and the annular body including an inner surface that at least partially defines the quench aperture and a shelf surface;
the quench aperture extending along a centerline through the combustor wall from an exterior surface of the annular body to an exterior surface of the heat shield facing a combustion chamber in the turbine engine, the exterior surface of the annular body being flush with an exterior surface of the shell, the exterior surface of the shell facing away from the combustion chamber;
the cooling aperture in fluid communication with the quench aperture, and at least a portion of the cooling aperture extending radially outward from the quench aperture relative to the centerline;
the shelf surface vertically recessed within the combustor wall relative to the exterior surface of the heat shield; and
the inner surface and the shelf surface defining a peripheral inner channel in the annular body, the shelf surface facing toward the combustion chamber.

15. The assembly of claim 14, wherein the exterior surface of the heat shield is configured to partially form a peripheral boundary of the combustion chamber.

* * * * *